(12) United States Patent
Pujari

(10) Patent No.: US 6,682,820 B1
(45) Date of Patent: Jan. 27, 2004

(54) RECESSION RESISTANT COATED CERAMIC PART

(75) Inventor: Vimal K. Pujari, Northboro, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 10/284,693

(22) Filed: Oct. 31, 2002

(51) Int. Cl.$^7$ ............................................... B32B 15/04
(52) U.S. Cl. .................. 428/426; 438/432; 438/428; 438/446; 438/689; 438/698; 438/699; 438/701; 428/702; 428/704
(58) Field of Search .......................... 428/426, 428, 428/432, 446, 689, 698, 699, 701, 702, 704; 427/248.1

(56) References Cited

U.S. PATENT DOCUMENTS

| | | | |
|---|---|---|---|
| 4,081,272 A | 3/1978 | Adlerborn | |
| 4,256,688 A | 3/1981 | Adlerborn et al. | |
| 5,284,616 A | 2/1994 | Mattsson et al. | |
| 5,908,796 A | 6/1999 | Pujari et al. | |
| 6,158,894 A | 12/2000 | Pujari et al. | |
| 6,254,935 B1 * | 7/2001 | Eaton et al. | 427/376.2 |
| 6,296,942 B1 * | 10/2001 | Eaton et al. | 428/446 |
| 6,322,889 B1 * | 11/2001 | Lara-Curzio et al. | 428/378 |
| 2003/0027012 A1 * | 2/2003 | Spitsberg et al. | 428/615 |
| 2003/0035907 A1 * | 2/2003 | Campbell et al. | 428/26 |

FOREIGN PATENT DOCUMENTS

JP    2001-019556    *  1/2001   ......... C04B/035/64

* cited by examiner

Primary Examiner—Deborah Jones
Assistant Examiner—Vivek Koppikar

(57) ABSTRACT

A recession resistant coated ceramic part. The ceramic part has a ceramic substrate and a recession resistant coating disposed on the substrate. The coating includes a plurality of layers diffusion bonded to each other and to the substrate respectively. The top most layer is characterized by a greater resistance to recession due to oxidation than that of the substrate.

8 Claims, 2 Drawing Sheets

RECESSION RESISTANT COATED CERAMIC PART

FIELD OF THE INVENTION

The present invention relates to silicon nitride ceramic material, e.g., $Si_3N_4$. More specifically, the present invention relates to coatings for silicon nitride parts, which resist recession/oxidation (recession resistant coatings) in high temperature, high humidity and high gas flow environments, and methods of making the same.

BACKGROUND OF THE INVENTION

Ceramic materials, which are joined by ionic or covalent bonds, are typically composed of complex compounds containing both metallic and non-metallic elements. Ceramics typically are hard, brittle, high melting point materials with low electrical and thermal conductivity, good chemical and thermal stability, and high compressive strengths. Ceramics, such as silicon nitride, offer excellent high temperature strength and creep resistance and hence are employed in a variety of high temperature demanding applications, such as bearings and valves for internal combustion engines.

Additionally, silicon nitride and other various ceramics may be used in 300 to 800 kilowatt gas turbines, e.g., micro-turbines, where the internal components are subjected to the combination of high temperature, high humidity and high gas flows. These micro-turbines are frequently used as specialized power generators for industrial applications. The internal temperatures of ceramic micro-turbines can run at higher temperatures than metal micro-turbines, e.g., 1370 degrees centigrade (C) or higher, and therefore can also run at higher efficiencies, e.g., about 15% higher.

One example of a ceramic used in a micro-turbine environment is a silicon nitride compound available from Saint-Gobain Ceramics & Plastics, Inc., of Worcester, Mass., having the trade name NT154®. This material is described in U.S. Pat. No. 4,904,624, which is herein incorporated by reference in its entirety. NT154® typically is composed of 96% silicon nitride and 4% yttrium, and is also typically subjected to a sintering (densification) process to increase its density and reduce its porosity.

In a high temperature and humidity environment, silicon nitrides, and other silicon-based ceramics, will oxidize to form a thin layer of silicon dioxide ($SiO_2$) on its surface. Over time, this silicon dioxide layer can crack or flake off to expose more ceramic to oxidation. As a result, the surface of the ceramic will slowly recede or wear away. This can be especially problematic in cases where ceramic parts must have a wear life of many thousands of hours. One such example of this is in micro-turbines which are designed to run 30,000, 45,000 or more hours.

Moreover, in micro-turbine environments, the high gas flow rates exacerbates the problem of ceramic surface recession. That is, the high gas flow continuously strips the silicon dioxide layer away to re-expose the surface to oxidation more rapidly. As a result it is possible in a micro-turbine for the surface of the ceramic to recede at rates of up to 1 mg/sq. cm hour. In other words, a square centimeter of ceramic surface, which is exposed to the environmental conditions within a micro-turbine, can potentially recede or be worn away at the rate of one milligram of thickness per hour.

A variety of environmental barrier coatings (EBC) have been employed, using such techniques as physical vapor deposition (PVD) or chemical vapor deposition (CVD), to provide a recession resistant coating for the ceramic. These barrier coatings can potentially reduce the rate of ceramic recession by upwards of an order of magnitude, i.e., a factor of 10. Unfortunately, the coatings are prone to cracking and pealing due to differences in the coefficient of expansion between the layer and the ceramic surface.

Based on the foregoing, it is the general object of the present invention to provide an environmental barrier coating for a ceramic, and method of making the coating, which overcomes the problems and drawbacks associated with the prior art.

SUMMARY OF THE INVENTION

The present invention offers advantages and alternatives over the prior art by providing a recession resistant coated ceramic part. The ceramic part has a ceramic substrate and a recession resistant coating disposed on the substrate. The coating includes a plurality of layers diffusion bonded to each other and to the substrate respectively. The top most layer is characterized by a greater resistance to recession due to oxidation than that of the substrate.

Since the layers are diffusion bonded, the problem of separation of layers is greatly alleviated. Additionally, the added resistance of the top most layer to recession due to oxidation greatly reduces the rate of recession of the over all ceramic part.

In an alternative exemplary embodiment of the recession resistant coated ceramic part, the layers graduate the effects of thermal expansion between the substrate and the top most layer. Additionally, in another embodiment, the substrate of the recession resistant ceramic part is composed substantially of silicon nitride.

An exemplary embodiment of a method of making a recession resistant coated ceramic part in accordance with the present invention includes forming a green porous ceramic part and coating the part with a plurality of layers. The top most layer is characterized by a greater resistance to recession due to oxidation than that of the part. The coated part is then surrounded in a hermetically sealable substance. The sealable substance is then made to conform to the part to form a hermetic seal thereon. The sealed and coated part is subsequently HIP (Hot Isostatically Pressed) processed to simultaneously densify the green part and diffusion bond the plurality of layers to each other and to the part respectively.

In an alternative embodiment, the hermetically sealable substance is glass and heat is applied to soften the glass such that the glass conforms to the shape of the part to form a hermetic seal over the part.

DETAILED DESCRIPTION OF THE PREFERRED EMBODIMENTS

Figure 1:
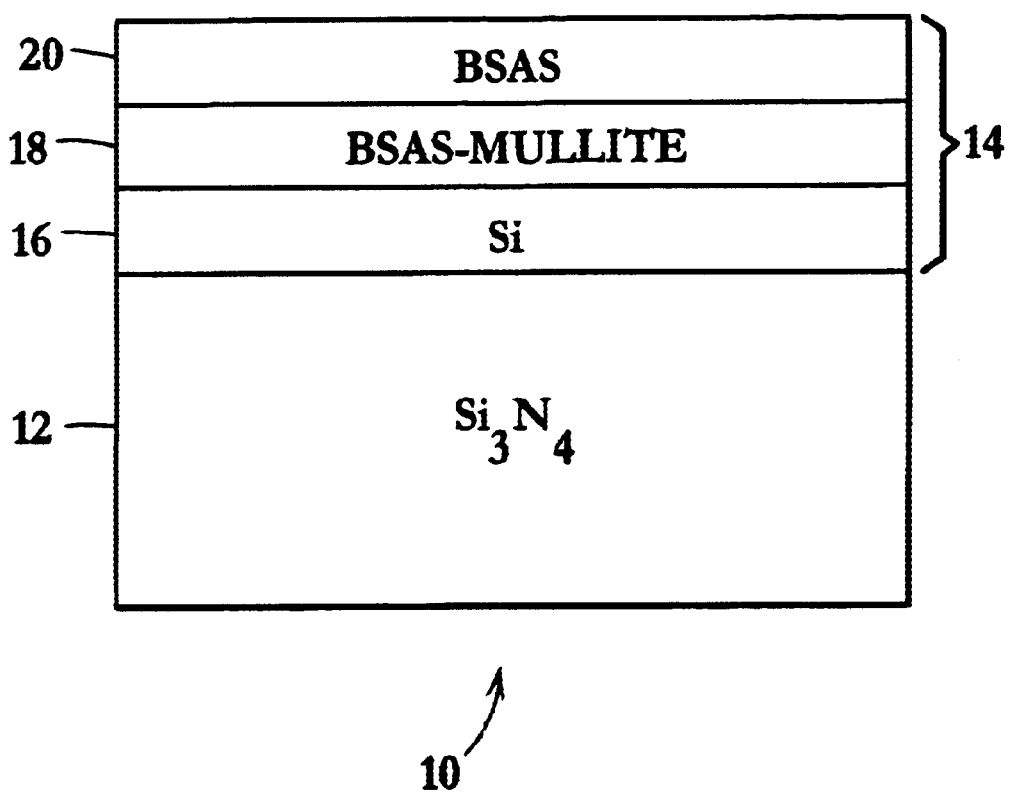
FIG. 1 is a side view of an exemplary embodiment of a recession resistant coated ceramic part in accordance with the present invention.

Referring to FIG. 1, an exemplary embodiment of a recession resistant coated ceramic part in accordance with the present invention is shown generally at 10. The coated part 10 includes a ceramic substrate 12 (i.e., the ceramic), which in this case is composed of a silicon nitride ceramic such as NT154. Silicon nitride offers excellent high temperature strength and creep resistance and hence is employed in a variety of high temperature demanding applications such as in jet engine blades, vanes or bearings.

However, silicon nitride suffers from a recession/oxidation problem at high temperature (900–1370 degree C.), humid environments such as those experienced in gas turbine (micro-turbine) applications. Accordingly, for such environments, a multi-layer recession resistant coating 14 is disposed over the ceramic 12 to protect its exposed surfaces.

The multi-layer coating 14 can include a variety of oxide (or non-oxide) based coatings, such as silicon (Si), $B_4C$, $ZrO_2$ and Zirconia Toughened Alumina (ZTA). Additionally, environmental barrier coatings may be employed such as barium alumino silicate (BAS), Barium Strontium Alumino Silicate (BSAS). Moreover, Mullite ($3Al_2O_3$-$2SiO_2$), may also be used. Mullite is a stable form of aluminum silicate which can be formed by a variety of methods, including by heating other aluminum silicates (such as cyanite, sillimanite and andalusite) to high temperatures.

Due to differences in the coefficients of expansion between the coating material 14 and the ceramic substrate 12, single layer coatings often have a tendency to crack, peal off or otherwise have adhesion problems at high temperatures. Accordingly, multi-layer coatings, such as the one exemplified in FIG. 1 as reference number 14, are used to gradually relieve the stresses due to thermal expansion differences between the ceramic substrate 12 and the top most layer.

In the present case, the coating 14 is a three-layer coating. The lower layer 16, i.e., the layer abutting the surface of the silicon nitride substrate 12, is composed of silicon. The silicon layer's 16 coefficient of expansion is the closest of the three layers to that of the silicon nitrate substrate 12, and will experience the least amount of adhesion problems with the substrate as the part 10 is heated. The middle layer 18, is composed of a combination of BSAS and mullite. The BSAS-mullite layer 18 is also stable at higher temperatures, but the difference between its coefficient of expansion and the silicon nitride substrate 12 is greater than that of the silicon layer 16. Finally, the top most layer is composed primarily of BSAS. The BSAS layer 20 provides a stable recession resistant environmental barrier, while the two lower layers 18, 16 graduate the effects of thermal expansion between the silicon nitride substrate 12 and the BSAS layer.

Even though the effects of thermal expansion between layers 16, 18 and 20 are graduated, adhesion between the layers can still be problematic due to the dissimilarity between the material composition of the layers. However, as will be explained in greater detail hereinafter, the layers 16, 18 and 20, as well as the substrate 12, are diffusion bonded together under heat and pressure to produce exceptionally strong bonds even between the dissimilar materials. That is, heat and pressure are applied to literally force the molecules and atoms of the layers to migrate across at their boundaries. Therefore, some of the BSAS molecules of the top layer 20 are intermingled in with the BSAS-mullite molecules of the middle layer 18, and vice versa. Additionally, some of the silicon atoms of the bottom layer 16 have diffused across into the bottom region of the middle layer 18, while some of the BSAS-mullite molecules have also migrated into the silicon layer 16. As a result of this diffusion bonding, the problem of separation between layers of the coating 14 is greatly alleviated.

Though the above part 10 is illustrated as having three layers 16, 18 and 20 in its coating 14, it will be understood that any number of layers, greater than or less than three, may also be used. Additionally, the composition and order of the layers may also be changed. By way of example, a top layer composed primarily of mullite can also provide a substantially recession resistant layer in the high temperature, high humidity and high gas flow environment of a micro turbine.

Figure 2:
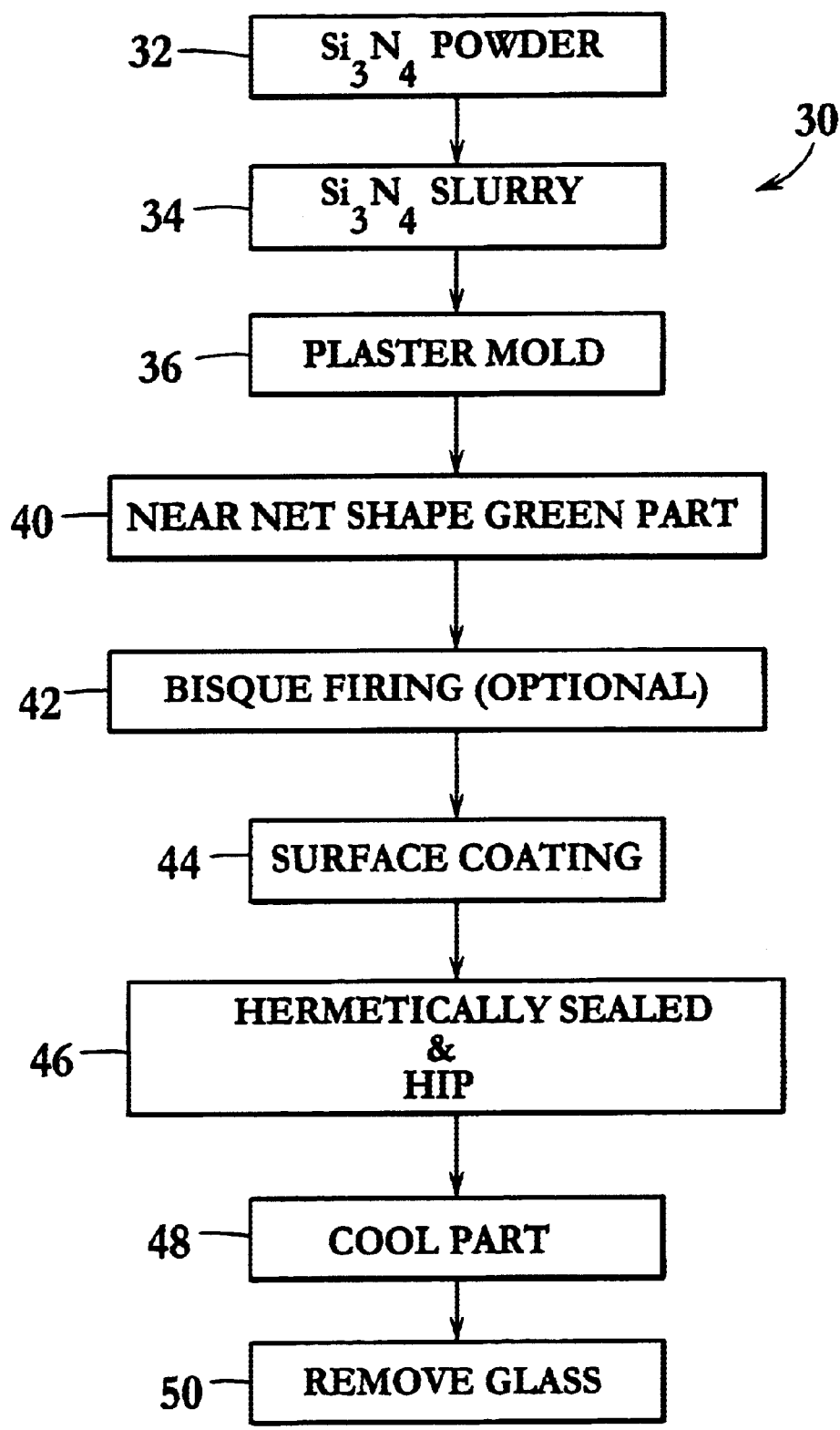
FIG. 2 is a flow chart of an exemplary embodiment of making a recession resistant coated ceramic part in accordance with the present invention.

Referring to FIG. 2, a flow chart 30 illustrates a typical manufacturing process for making the part 10 in accordance with the present invention. In a typical green forming operation, raw silicon nitride ($Si_3N_4$) powder or granules 32 is typically mixed with de-ionized water to form a slurry 34. The silicon nitride is preferably, in this embodiment, NT154, however other silicon nitrides as well as other ceramics may also be used.

The slurry is poured into a pre-prepared plaster mold 36 to produce a near net shape green part 40. Although this preferred embodiment illustrates a slurry poured into a cast, a dry powder may also be pressed into a shape as well. The near net shape green part 40 typically has a density of between 50 to 60% of its theoretical density, and is fairly porous.

After the green forming process 40, the part is preferably dip surface coated 44 with multiple coatings, e.g., BSAS, Si, mullite, etc. Often in the green state, before dip coating 44, the part is bisque fired 42. That is, it is subjected to about 1000 degrees C. in the presence of an inert gas such as nitrogen, in order to give the part enough strength such that it will hold up to the coating process. After bisque firing, the part is still porous, and has not densified that much more, but the ceramic particles have fused together enough to prevent the part from coming apart or dissolving during the various coating processes.

Though dip coating is illustrated as the preferred embodiment, various other methods may also be used. For example, the parts may be subjected to physical vapor deposition (PVD) or chemical vapor deposition (CVD). PVD methods may include laser ablation, in which a high-energy laser blasts material from a target and through a vapor to the green part, which acts as a substrate, where the material is deposited. Another PVD approach involves sputtering, in which energetic electrons bombard the surface of a target, removing material as a vapor that is deposited on the green part substrate again. A typical CVD process involves passing a carrier gas over a volatile organometallic precursor; the gas and the organometallic react, producing a ceramic compound that is deposited downstream on a green part substrate.

After the multiple surface coatings have been applied 44, the coated green part is surrounded by a hermetically sealable substance and subjected to a hot isostatic pressure (HIP) process 46. Various types of HIP processes are well known in the art. Examples of HIP processes are described in U.S. Pat. Nos. 5,284,616, 4,256,688 and 4,081,272 which are herein incorporated by reference in their entirety. A typical HIP process utilized to densify a ceramic such as silicon nitride can exceed temperatures of 1600 degrees centigrade and pressures of 50 MPa.

The hermetically sealable substance is preferably powdered glass, but other substances may also be used. For example, the hermetically sealable substance may be a metal container in which the part is placed, and from which the air is evacuated to conform the container to the part. The hermetically sealable substance seals the voids in the porous part so that gas pressure may be applied during the HIP process in order to densify the ceramic part.

When powdered glass is utilized as the hermetically sealable substance, the process involves placing the green part in a crucible and surrounding it with the glass powder. Heat is then applied to soften the glass such that it conforms to the shape of the part to form a viscous hermetic seal over the pours of the part. An inert gas can be then be utilized to pressurize the part without the gas flowing through the pores of the part and loosing pressure.

The HIP process advantageously performs two operations simultaneously, i.e., it densifies the part to nearly 100% of its theoretical limit, and it diffusion bonds the multiple coatings to the outer surface of the part. Diffusion bonding is an atomic or molecular diffusion between the various layers of coating. As opposed to other methods of bonding, such as those encountered during PVD or CVD coating, diffusion bonding is a brute force approach which forces strong bonds even between dissimilar coatings.

Moreover, the glass hermetic seal may act as an additional top layer of coating, which is subjected to the heat and pressure of the HIP process as well. Accordingly, under some circumstances, the glass can optionally be engineered to diffuse bond into the adjacent layer to form an additional protective glass layer for the coating. Alternatively, a barrier layer such as Boron Nitride may be used between the part and the encapsulant glass to eliminate any reaction at the interface.

After the HIP process, the part is cooled 48 and the glass layer is removed 50. The glass layer is weaker than the other layers and can be easily sandblasted away.

Once the outer glass layer is removed the process is now complete. The part is now fully densified and includes a recession resistant coating. Additionally, the coating has several layers that are diffusion bonded together from the HIP process to form exceptionally strong bonds therebetween.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A recession resistant coated ceramic part comprising:
   a ceramic substrate; and
   a recession resistant coating disposed on the substrate, the coating including a plurality of layers diffusion bonded to each other and to the substrate respectively via a hot isostatic pressing process, the layers including a region of atomic diffusion at each interface between the layers wherein the atoms of a layer have diffused across into an adjacent layer and vice versa;
   wherein the top most layer is characterized by a greater resistance to recession due to oxidation than that of the substrate.

2. The recession resistant coated ceramic part of claim 1 wherein the layers graduate the effects of thermal expansion between the substrate and the top most layer.

3. The recession resistant coated ceramic part of claim 1 wherein the top most layer is characterized by a resistance to recession due to oxidation that is at least a factor of 10 greater than that of the substrate.

4. The recession resistant coated ceramic part of claim 1 wherein the substrate is composed substantially of silicon nitride.

5. The recession resistant coated ceramic part of claim 4 wherein the substrate is composed substantially of 96% silicon nitride and 4% yttrium.

6. The recession resistant coated ceramic part of claim 1 wherein the coating has at least three layers.

7. The recession resistant coated ceramic part of claim 1 wherein the layers are primarily composed of at least one of the group of silicon, $B_4C$, $ZrO_2$, Zirconia Toughened Alumina, BAS, BSAS, mullite, and an aluminum silicate.

8. The recession resistant coated ceramic part of claim 1 wherein the top layer is composed of a glass.

* * * * *